(12) United States Patent
Lee

(10) Patent No.: US 9,219,875 B2
(45) Date of Patent: Dec. 22, 2015

(54) IMAGE DISPLAY APPARATUS AND METHOD

(75) Inventor: Jongha Lee, Seoul (KR)

(73) Assignee: LG Electronics Inc., Seoul (KR)

(*) Notice: Subject to any disclaimer, the term of this patent is extended or adjusted under 35 U.S.C. 154(b) by 464 days.

(21) Appl. No.: 12/913,616

(22) Filed: Oct. 27, 2010

(65) Prior Publication Data

US 2011/0113445 A1 May 12, 2011

(30) Foreign Application Priority Data

Nov. 9, 2009 (KR) .................. 10-2009-0107657

(51) Int. Cl.
| | | |
|---|---|---|
| G06F 3/00 | (2006.01) | |
| G06F 13/00 | (2006.01) | |
| H04N 5/445 | (2011.01) | |
| G06F 17/30 | (2006.01) | |
| H04N 5/64 | (2006.01) | |
| H04N 21/482 | (2011.01) | |
| H04N 21/488 | (2011.01) | |
| H04N 21/81 | (2011.01) | |

(52) U.S. Cl.
CPC ...... *H04N 5/44543* (2013.01); *G06F 17/30696* (2013.01); *G06F 17/30991* (2013.01); *H04N 5/64* (2013.01); *H04N 21/488* (2013.01); *H04N 21/4828* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 5,532,753 | A * | 7/1996 | Buchner et al. | 725/56 |
| 5,671,411 | A * | 9/1997 | Watts et al. | 725/43 |
| 5,867,227 | A * | 2/1999 | Yamaguchi | 725/56 |
| 6,005,565 | A * | 12/1999 | Legall et al. | 715/721 |
| 6,505,194 | B1 * | 1/2003 | Nikolovska et al. | 707/768 |
| 6,640,337 | B1 * | 10/2003 | Lu | 725/39 |
| 6,865,746 | B1 * | 3/2005 | Herrington et al. | 725/53 |
| 7,076,734 | B2 * | 7/2006 | Wolff et al. | 715/720 |
| 7,209,942 | B1 * | 4/2007 | Hori et al. | 709/203 |
| 7,228,556 | B2 * | 6/2007 | Beach et al. | 725/53 |
| 7,373,652 | B1 * | 5/2008 | Bayrakeri et al. | 725/53 |
| 7,403,935 | B2 * | 7/2008 | Horvitz et al. | 1/1 |
| 7,454,777 | B1 * | 11/2008 | Nishikawa et al. | 725/151 |
| 7,496,277 | B2 * | 2/2009 | Ackley et al. | 386/248 |
| 7,496,945 | B2 * | 2/2009 | Rodriguez | 725/51 |
| 7,506,350 | B2 * | 3/2009 | Johnson | 725/53 |
| 7,549,127 | B2 * | 6/2009 | Chasen et al. | 715/788 |

(Continued)

FOREIGN PATENT DOCUMENTS

| | | |
|---|---|---|
| CN | 1441373 | 9/2003 |
| CN | 1955898 | 5/2007 |

(Continued)

OTHER PUBLICATIONS

Database WPI—Week 200901, Thomas Scientific, London, GB; AN 2009-A01959; XP002683428, & CN 101266608 A (WEI X), Sep. 17, 2008; Abstract.

(Continued)

*Primary Examiner* — Jonathan V Lewis
(74) *Attorney, Agent, or Firm* — Ked & Associates, LLP

(57) ABSTRACT

A method for operating an image display apparatus having a first display and a second display different from the first display includes displaying an image on the first display, displaying a search window on the second display, and displaying search results matching a search term entered in the search window.

22 Claims, 23 Drawing Sheets

(56) References Cited

U.S. PATENT DOCUMENTS

| | | | |
|---|---|---|---|
| 7,797,714 B1 * | 9/2010 | Nagasaka et al. | 725/53 |
| 7,869,518 B2 * | 1/2011 | Kim et al. | 375/240.16 |
| 7,974,962 B2 * | 7/2011 | Krakirian et al. | 707/706 |
| 8,051,450 B2 * | 11/2011 | Robarts et al. | 725/53 |
| 8,079,047 B1 * | 12/2011 | Jerding et al. | 725/53 |
| 8,122,034 B2 * | 2/2012 | Aravamudan et al. | 707/752 |
| 8,151,301 B2 * | 4/2012 | Bennett | 725/41 |
| 8,154,580 B2 * | 4/2012 | Sim et al. | 348/14.02 |
| 8,205,230 B2 * | 6/2012 | Gossweiler et al. | 725/39 |
| 8,346,789 B2 * | 1/2013 | Klein, Jr. | 707/758 |
| 8,473,979 B2 * | 6/2013 | White et al. | 725/39 |
| 8,473,988 B2 * | 6/2013 | Ohta et al. | 725/58 |
| 8,601,510 B2 * | 12/2013 | Araki et al. | 725/41 |
| 8,698,956 B2 * | 4/2014 | Kondo et al. | 348/552 |
| 8,988,495 B2 * | 3/2015 | Kim | 348/43 |
| 2003/0154483 A1 * | 8/2003 | Mory et al. | 725/53 |
| 2005/0278741 A1 | 12/2005 | Robarts et al. | |
| 2008/0256443 A1 | 10/2008 | Li et al. | 715/700 |

FOREIGN PATENT DOCUMENTS

| | | |
|---|---|---|
| CN | 101446969 | 6/2009 |
| EP | WO 01/99436 | 12/2001 |
| EP | 2 007 138 | 12/2008 |
| KR | 10-2006-0088845 A | 8/2006 |
| KR | 10-2007-0028253 A | 3/2007 |
| KR | 10-2009-0096401 A | 9/2009 |

OTHER PUBLICATIONS

European Search Report dated Sep. 25, 2012.
Chinese Office Action dated Nov. 2, 2012.
Chinese Office Action issued in Application No. 201010624974.9, dated Jul. 22, 2013.
Korean Office Action issued in Application No. 10-2009-0107657 dated Aug. 21, 2015.

\* cited by examiner

IMAGE DISPLAY APPARATUS AND METHOD

CROSS-REFERENCE TO RELATED ED APPLICATION

This application claims the priority benefit of Korean Patent Application No. 10-2009-0107657, filed on Nov. 9, 2009, in the Korean Intellectual Property Office, the disclosure of which is incorporated herein by reference.

BACKGROUND

1. Field

One or more embodiments described herein relate to displaying information.

2. Background

A variety of image display apparatuses have been proposed. Some of them have been equipped with increased functionality. However, none of these apparatuses offer a way of allowing a user to obtain and display information on programming and internet content, whether related or not, in an efficient and cooperate manner.

DETAILED DESCRIPTION

Figure 1:
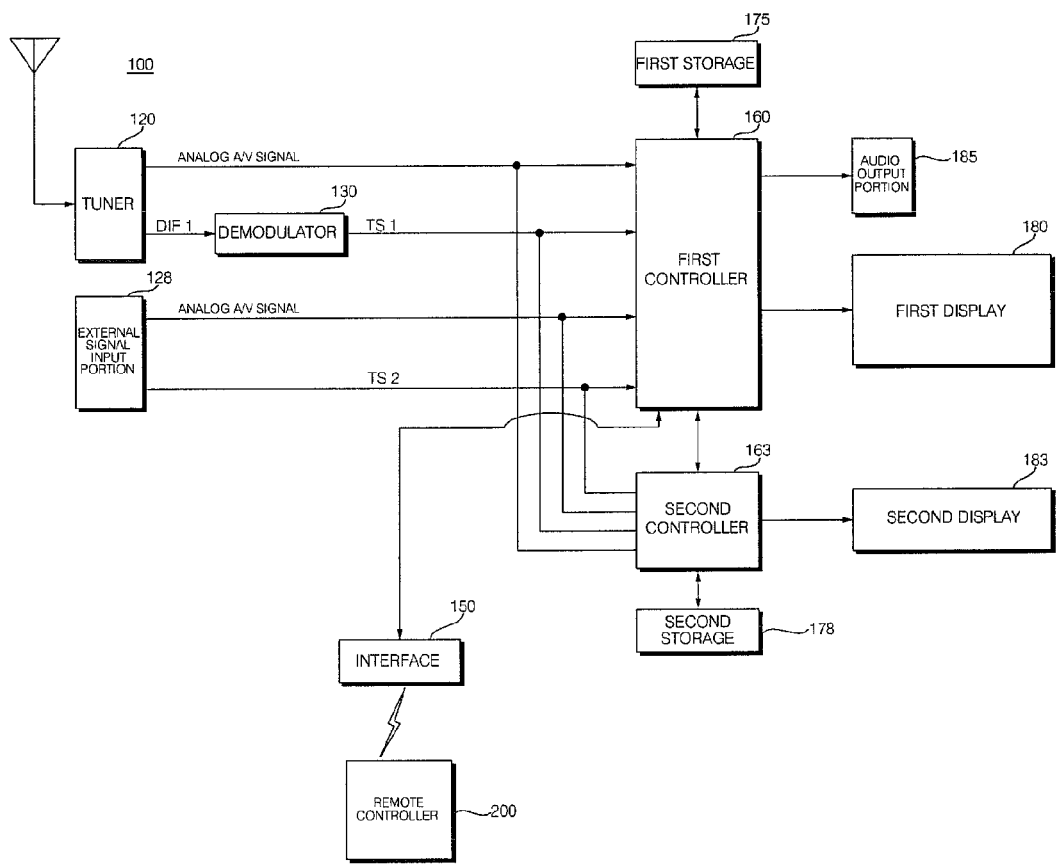
FIG. 1 is a diagram showing one embodiment of an image display apparatus that includes two independent display units.

FIG. 1 shows one embodiment of an image display apparatus 100 which includes a tuner 120, an external signal input portion 128, a demodulator 130, an interface 150, a first controller 160, a second controller 163, a first storage 175, a second storage 178, a first display 180, a second display 183, and an audio output portion 185.

The tuner 120 selects a Radio Frequency (RF) or other type of broadcast or television signal corresponding to a channel selected by a user from among a plurality of broadcast signals received through an antenna. The tuner down-converts the selected RF broadcast signal into a digital Intermediate Frequency (IF) signal or analog baseband Audio/Video (A/V) signal.

More specifically, if the selected RF broadcast signal is a digital broadcast signal, the tuner 120 down-converts the selected RF broadcast signal into a digital IF signal, DIF 1. On the other hand, if the selected RF broadcast signal is an analog broadcast signal, the tuner down-converts the selected RF broadcast signal to an analog baseband A/V signal, CVBS 1/SIF. That is, the tuner may be a hybrid tuner capable of processing not only digital broadcast signals but also analog broadcast signals. The analog baseband A/V signal CVBS1/SIF may be directly input to the first controller 160.

In addition, the tuner 120 may be able to receive RF broadcast signals from an Advanced Television Systems Committee (ATSC) single-carrier system or from a Digital Video Broadcasting (DVB) multi-carrier system, as described later.

While the only one tuner 120 is illustratively shown in FIG. 1, other embodiments of the image display apparatus may include two or more tuners. In the case of using two or more tuners, aside from the RF broadcast signal received through the tuner 120, a second tuner (not shown) may sequentially or periodically receive a number of RF broadcast signals corresponding to a number of broadcast channels previously stored in image display apparatus 100. Like tuner 120, the second tuner may down-convert a received digital RF broadcast signal to a digital IF signal or a received analog broadcast signal to a baseband A/V signal, CVBS 1/SIF.

The demodulator 130 receives the digital IF signal DIF 1 from the tuner and demodulates the digital IF signal DIF 1.

For example, if the digital IF signal DW 1 is an ATSC signal, the demodulator may perform 8-Vestigal SideBand (VSB) demodulation on the first digital IF signal DIF 1. The demodulator may also perform channel decoding. For the channel decoding, the demodulator may include a Trellis decoder (not shown), a de-interleaver (not shown) and a Reed-Solomon decoder (not shown) and perform Trellis decoding, de-interleaving and Reed-Solomon decoding.

For example, if the digital IF signal DIF 1 is a DVB signal, demodulator 130 may perform Coded Orthogonal Frequency Division Multiple Access (COFDMA) demodulation on the first digital IF signal DIF 1. The demodulator may also perform channel decoding. For the channel decoding, the demodulator may include a convolution decoder (not shown), a de-interleaver (not shown), and a Reed-Solomon decoder (not shown) and perform convolution decoding, de-interleaving, and Reed-Solomon decoding.

The external signal input portion 128 receives signals from an external device. For reception of the external input signals, the external signal input portion may include an A/V Input/Output (I/O) portion (not shown) and a wireless communication module (not shown).

The external signal input portion 128 may be connected to an external device such as a Digital Versatile Disc (DVD), a Bluray disc, a gaming device, a camcorder, or a computer (e.g., a laptop computer). Then, the external signal input portion externally receives video, audio, and/or data signals from the external device and transmits the received external input signals to the first and second controllers 160 and 163. In addition, the external signal input portion may output video, audio, and data signals processed by the first or second controller 160 or 163 to the external device.

In order to receive or transmit A/V signals from or to the external device, the A/V I/O portion of external signal input portion 128 may include an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, a D-sub port, an Institute of Electrical and Electronics Engineers (IEEE)-1394 port, a Sony/Philips Digital Interconnect Format (S/PDIF) port, and a LiquidHD port.

Various input signals received through the external signal input portion 128 may be input to the first or second controller 160 or 162. For example, analog signals received through the CVBS port and the S-video port may be input to the first or second controller or converted to digital signals by an Analog-to-Digital (A/V) converter (not shown).

The wireless communication module of external signal input portion 128 may wirelessly access the Internet. For the wireless Internet access, the wireless communication module may use a Wireless Local Area Network (WLAN) (i.e., Wi-Fi), Wireless Broadband (Wibro), World Interoperability for Microwave Access (WiMax), and High Speed Downlink Packet Access (HSDPA).

In addition, the wireless communication module may perform short-range wireless communication with other electronic devices. For the short-range wireless communication, the wireless communication module may use Bluetooth, Radio-Frequency IDentification (RFID), Infrared Data Association (IrDA), Ultra WideBand (UWB), and ZigBee.

The external signal input portion 128 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the LiquidHD port and may thus receive data from or transmit data to the various set-top boxes. For example, when connected to an Internet Protocol Television (IPTV) set-top box, the external signal input portion 128 may transmit video, audio and data signals processed by the IPTV set-top box to the first or second controller 160 or 163 and may transmit various signals received from the first or second controller 160 or 163 to the IPTV set-top box.

The term 'IPTV' as used herein may cover a broad range of services, depending on transmission networks, such as ADSL-TV, VDSL-TV, FTTH-TV, TV over DSL, Video over DSL, TV over IP (TVIP), Broadband TV (BTV), and Internet TV and full-browsing TV, which are capable of providing Internet-access services.

A digital signal from the external signal input portion 128 may be input to the first or second controller 160 or 163, for processing. While the digital signal may comply with various standards, it is shown as a second stream signal Transport Stream (TS) 2 in FIG. 1. The second stream signal TS 2 may be a signal in which a video signal, an audio signal and a data signal are multiplexed. For example, the second stream signal TS 2 may be an MPEG-2 TS signal obtained by multiplexing an MPEG-2 video signal and a Dolby AC-3 audio signal.

The demodulator 130 may perform demodulation and channel decoding on the digital IF signal DIF 1 received from the tuner 120, thereby obtaining a first stream signal TS 1. The first stream signal TS 1 may be a signal in which a video signal, an audio signal and a data signal are multiplexed. For example, the first stream signal TS 1 may be an MPEG-2 TS signal obtained by multiplexing an MPEG-2 video signal and a Dolby AC-3 audio signal. An MPEG-2 TS signal may include a 4-byte header and a 184-byte payload.

The first stream signal TS 1 is input to first or second controller 160 or 163 and thus subjected to demultiplexing and signal processing. Prior to being input to the first or second controller 160 or 163, the first stream signal TS 1 may be input to a channel browsing processor (not shown) and thus subjected to a channel browsing operation.

In order to properly handle not only ATSC signals but also DVB signals, the demodulator 130 may include an ATSC demodulator and a DVB demodulator.

The interface 150 transmits a signal received from the user to the first controller 160 or transmits a signal received from the first controller 160 to the user. For example, the interface 150 may receive various user input signals such as a power-on/off signal, a channel selection signal, and a screen setting signal from a remote controller 200 or may transmit a signal received from the first controller 160 to the remote controller 200. The interface 150 may also transmit signal received from the user to the second controller 163 or transmit a signal received from the second controller 163 to the user.

The first controller 160 may demultiplex an input stream signal into a number of signals and process the demultiplexed signals so that the processed signals can be output as A/V data. The first controller may provide overall control to the image display apparatus 100. In addition, the first controller 160 may include a demultiplexer (not shown), a video processor (not shown), an audio processor (not shown), a data processor (not shown), and an On Screen Display (OSD) generator (not shown).

The first controller 160 may control the tuner 120 to select an RF broadcast signal of a user-selected channel or an RF broadcast signal of a preliminarily stored channel.

The first controller 160 may demultiplex an input stream signal TS 1 or TS 2, e.g. an MPEG-2 TS signal into a video signal, an audio signal and a data signal.

Thereafter, the first controller 160 may process the video signal. For example, if the video signal is an encoded signal, controller 160 may decode the video signal. More specifically, if the video signal is an MPEG-2 encoded signal, controller 160 may decode the video signal by MPEG-2 decoding. On the other hand, if the video signal is an H.264-encoded DMB or DVB-handheld (DVB-H) signal, the controller 160 may decode the video signal by H.264 decoding.

In addition, the first controller 160 may adjust the brightness, tint and color of the video signal.

The video signal processed by the first controller 160 is displayed on the display 180. Alternatively, the video signal processed by the first controller may be output to an external output port connected to an external output device (not shown).

The first controller 160 may process the audio signal obtained by demultiplexing the input stream signal. For example, if the audio signal is an encoded signal, the first controller may decode the audio signal. More specifically, if the audio signal is an MPEG-2 encoded signal, the first controller may decode the audio signal by MPEG-2 decoding. On the other hand, if the audio signal is an MPEG-4 Bit Sliced Arithmetic Coding (BSAC)-encoded terrestrial DMB signal, the first controller 160 may decode the audio signal by MPEG-4 decoding. On the other hand, if the audio signal is an MPEG-2 Advanced Audio Coding (AAC)-encoded DMB or DVB-H signal, the first controller 180 may decode the audio signal by AAC decoding.

In addition, the first controller may adjust the base, treble or sound volume of the audio signal.

The audio signal processed by the first controller is output to the audio output portion 185, e.g., a speaker. Alternatively, the audio signal processed by the first controller may be output to an external output port connected to an external output device.

The first controller may process an input analog baseband A/V signal CVBS/SIF. The analog baseband A/V signal CUBS/SIF may be received from the tuner 120 or the external signal input portion 128. The processed video signal is displayed on the display 180 and the processed audio signal is output to the audio output portion 185, for example, the speaker.

The first controller may process the data signal obtained by demultiplexing the input stream signal. For example, if the data signal is an encoded signal such as an Electronic Program Guide (EPG), which is a guide to scheduled broadcast TV or radio programs, the first controller may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

The first controller may perform OSD processing. More specifically, the first controller may generate an OSD signal for displaying various pieces of information on the display as graphic or text data based on a user input signal received from the remote controller 200 and at least one of a processed video signal and a processed data signal.

The OSD signal may include various data such as a User-Interface (UI) screen, various menu screens, widgets, and icons for image display apparatus 100.

The second controller 163, like the first controller, may receive the stream signal TS 1 or TS 2 or the analog A/V signal and process video, audio and data signals. Other operations of the second controller are almost the same as those of the first controller.

The first controller may transmit and receive video and data signals to and from the second controller. While the first and second controllers are shown in FIG. 1 as operating in parallel, the second controller may alternatively be dependent on the first controller. For example, the second controller may receive at least one of search window information and search result information from the first controller.

In an exemplary embodiment, the first controller processes video and data signals to be displayed on first display 180 and the second controller processes video and data signals to be displayed on second display 183.

A search window is displayed on the second display 183 configured separately from the first display 180 in the single image display apparatus. Since the search window displayed on the second display 183 does not disturb normal viewing of an image displayed on the first display, user convenience is increased.

For example, if a search window display command is issued from the remote controller 200 with a broadcast image received through the tuner 120 and the demodulator 130 displayed on the first display 180 under the control of the first controller 160, the second controller 163 may control the search window to be displayed on the second display. Thus the search window can be displayed on the separately procedure second display, while allowing the user to view an ongoing image, thereby increasing user convenience.

The search window may be based on text or contents.

The text-based search window may be a Help search window in the image display apparatus or a web browser-based search window in the Web. Search results may appear in text in the text-based search window.

In an exemplary embodiment, the contents-based search window may refer to a search window designed for searching for contents or a search window in which the user enters contents as a search term. A text-based search term may be entered in the contents-based search window and not text but contents files may be presented as search results.

For entering contents as a search term, part of a specific image displayed on first display 160 may be dragged and dropped on the contents-based search window, for example. There are many available contents-based search terms including a video file, an audio file, etc. While the search results may be contents files, they may be other files such as but not limited to text files indicating what searched contents are about.

If contents files are collected as the search results, second controller 163 may control a list of images corresponding to the contents files to be displayed. For example, if the search results are image files, previews of the image files may be displayed. If the search results are music files, images indicating the music files may be displayed.

The image creation may be carried out in one of the channel browsing processor (not shown), first controller 160, and second controller 163. When the second controller generates the images indicating the contents files, the amount of a signal to be processed by first controller 160 may be reduced.

When a search is triggered by entering a specific search term in the search window, the search may be made across the image display apparatus or an external device connected to the image display apparatus wirelessly or wiredly. Or the Web may be searched through external signal input portion 128.

If the image display apparatus or the external device connected wirelessly or wiredly to the image display apparatus is searched, the first and second storages 175 and 178 may store search engines such as a Help search engine, a contents file search engine, etc. On the other hand, in case of a Web search, a search engine available on the Web may be used.

One or more interfaces (not shown) may be configured between the first and second controllers 160 and 163.

The first or second storage 175 or 178 may store programs for processing and controlling signals by the first or second controller and may also store processed video, audio and data signals. In addition, first or second storage 175 or 178 may store a search engine.

The first or second storage 175 or 178 may temporarily store a video, audio or data signal received from external signal input portion 128.

The first or second storage 175 or 178 may include, for example, at least one of a flash memory-type storage medium, a hard disc-type storage medium, a multimedia card micro-type storage medium, a card-type memory, a Random Access Memory (RAM) and a Read-Only Memory (ROM) such as an Electrically Erasable Programmable ROM (EEPROM).

The image display apparatus may play a file (such as a moving picture file, a still image file. a music file, or a text file) stored in first or second storage 175 or 178 to the user on first or second display 180 or 183.

The first or second display 180 or 183 may convert a processed video signal, a processed data signal, and an OSD signal received from first or second controller 160 or 163 or a video signal and a data signal received from the external signal input portion 128 to Red, Green, Blue (RGB) signals, thereby generating driving signals.

The first or second display 180 or 183 may correspond to into one of a variety of types of displays such as a Plasma Display Panel (PDP), a Liquid Crystal Display (LCD), an Organic Light-Emitting Diode (OLED), a flexible display, and a three-dimensional (3D) display. According to one embodiment, the first and second displays are not different sections of a single display screen, but rather independent display units which operate independently and at times in cooperation with one another as described herein. The independent operation may be achieved through the first and second controllers. The first or second display may also be implemented as a touch screen so that it is used not only as an output device but also as an input device.

More specifically, the image display apparatus may have two separate displays 180 and 183 and first and second controllers 160 and 163 for independently controlling the first and second displays, respectively.

Figure 11:
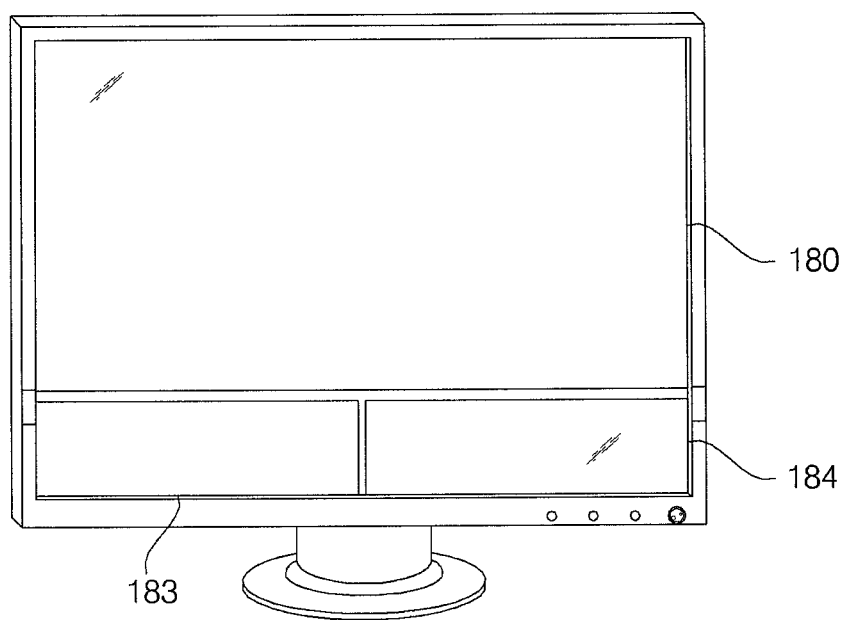
FIG. 11 shows another embodiment of an image display apparatus which includes three independent display units.

Aside from images displayed on the first display 180, the second display 183 may be used to display Picture-In-Picture (PIP) images, additional menus, additional contents data, etc. In this context, the second display 183 may be referred to as a media bar. Because a menu can be displayed on the second display without disturbing images displayed on the first display in the single image display apparatus, user convenience is increased. More than two displays may be included in other embodiments. For example, three or more displays can be implemented in the image display apparatus as shown in FIG. 11. Accordingly, more controllers may be provided to control the respective displays. The second display may be disposed at one of various positions with respect to the first display, for example, above, below, on the left side of, or on the right side of the first display.

The audio output portion 185 may receive a processed audio signal (e.g., a stereo signal, a 3.1-channel signal or a 5.1-channel signal) from the first or second controller 160 or 163 and output the received audio signal as voice. The audio output portion 185 may be implemented into various types of speakers.

The remote controller 200 transmits a user input to the interface 150. For the transmission of a user input, the remote controller may use various communication techniques such as Bluetooth, RF, IR, UWB and ZigBee. In addition, the remote controller may receive a video signal, an audio signal and a data signal from the interface 150 and output the received signals. Also, the remote controller may be a pointing device, for example, as described with reference to FIG. 2.

The channel browsing processor may further be provided to the image display apparatus 100 to generate thumbnail images corresponding to broadcast signals of channels or external input signals. The channel browsing processor may be positioned between the demodulator 130 and the first or second controller 160 or 163, or between the external signal input portion 128 and the first or second controller.

The channel browsing processor (not shown) may receive the stream signal TS 1 from the demodulator 130 or the stream signal TS 2 from the external signal input portion 128 and extract video signals from the received stream signal, thereby generating thumbnail images. The thumbnail images may be input to the first or second controller 160 or 163 directly or after being encoded. It is also possible to encode the thumbnail image to a stream and input the stream to the first or second controller. Thus the first or second controller may display a thumbnail list including a plurality of thumbnail images on first or second display 180 or 183.

The image display apparatus may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display apparatus may be a digital broadcast receiver capable of receiving cable broadcast programs, satellite broadcast programs or IPTV programs.

Examples of the image display apparatus include a TV receiver, a mobile phone, a smart phone, a laptop computer, a digital broadcast receiver, a Personal Digital Assistant (PDA) and a Portable Multimedia Player (PMP).

Figure 2A:
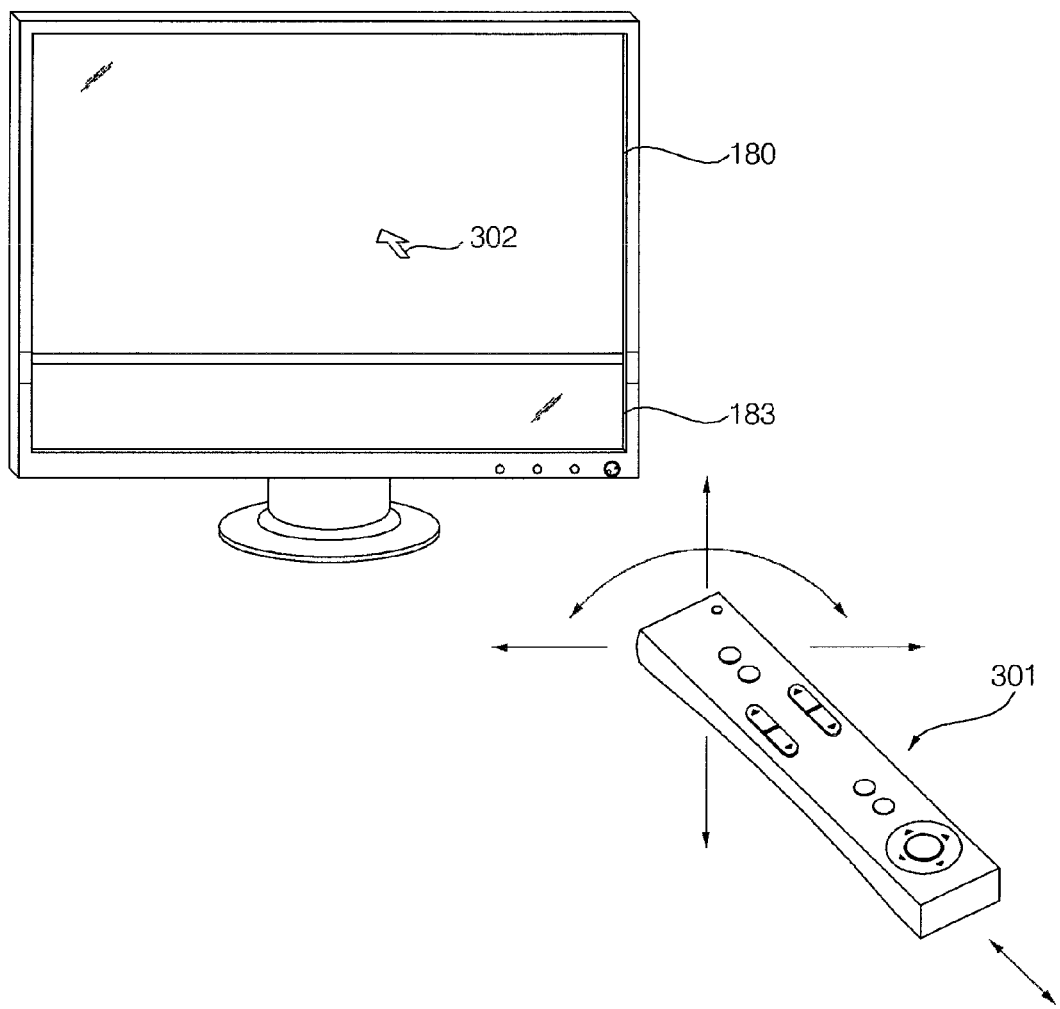
FIGS. 2A and 2B are diagrams showing examples of how the image display apparatus may be controlled using a remote controller.
Figure 2B:
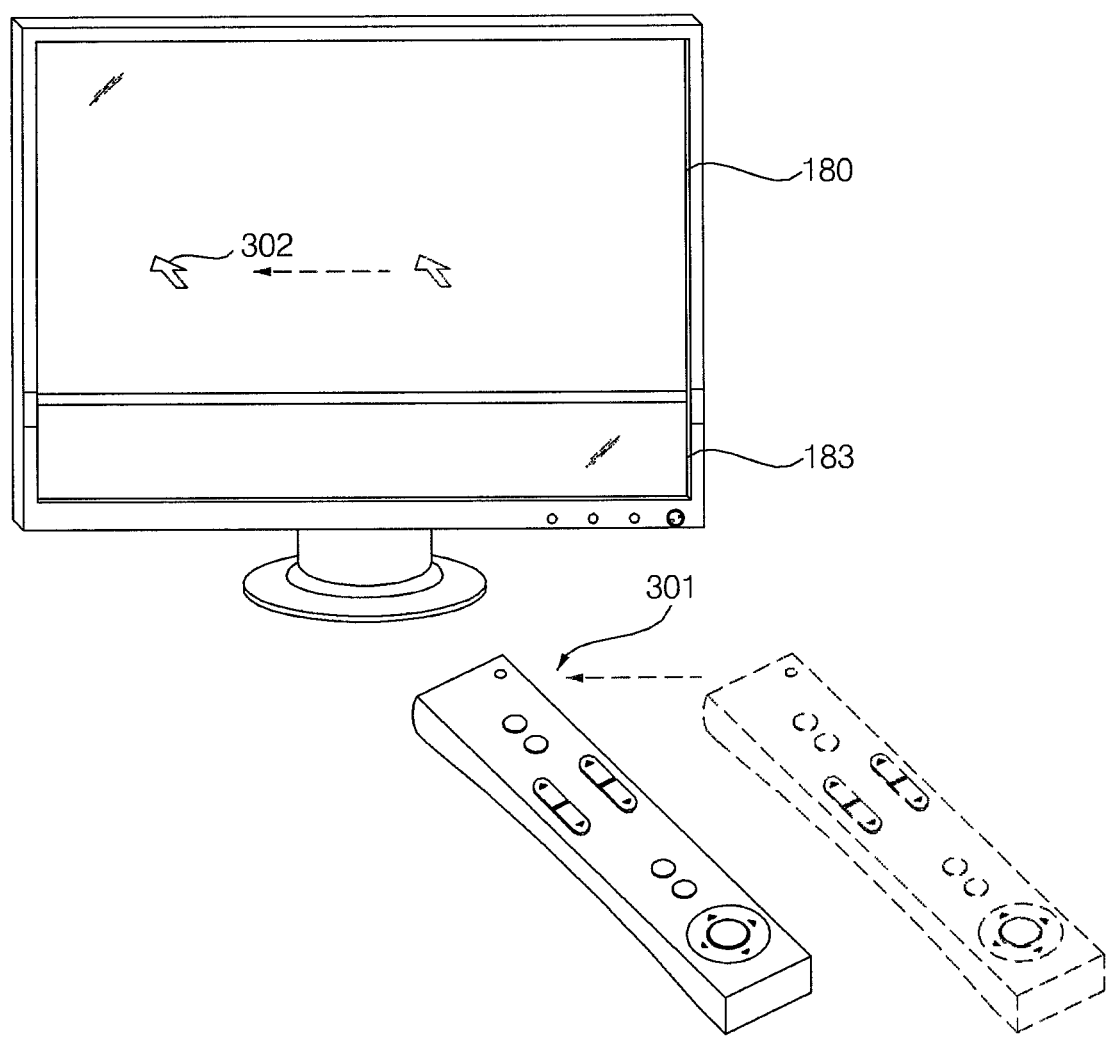

FIGS. 2A and 2B show examples of remote controller 200 in FIG. 1. This remote controller may be a pointing device 301, which may be a kind of remote controller for transmitting or otherwise entering a command into the image display apparatus. In accordance with one example, the pointing device may transmit or receive RF signals to or from the image display apparatus according to an RF communication standard. As illustrated in FIG. 2A, a pointer 302 indicating the movement of the pointing device 301 may be displayed on the image display apparatus.

The user may move the pointing device up and down, back and forth, and side to side or may rotate the pointing device. The pointer 302 moves in accordance with the movement of the pointing device 301, as illustrated in FIG. 2B.

Referring to FIG. 2B, if the user moves the pointing device to the left, the pointer 302 moves to the left accordingly. The pointing device includes a sensor capable of detecting motions. The sensor of the pointing device detects the movement of the pointing device and transmits motion information corresponding to the result of the detection to the image display apparatus. Then, the image display apparatus determines the movement of the pointing device 301 based on the motion information received from the pointing device and calculates the coordinates of a target point to which the pointer should be shifted in accordance with the movement of spatial remote control based on the result of the determination.

Referring to FIGS. 2A and 2B, the pointer 302 moves according to whether the pointing device 301 moves vertically or horizontally or rotates. The moving speed and direction of the pointer may correspond to the moving speed and direction of the pointing device. In addition, the pointer may move across the first and second displays 180 and 183.

In this exemplary embodiment, the pointer moves in accordance with the movement of the pointing device. Alternatively, an operation command may be input to the image display apparatus in response to the movement of the pointing device. That is, as the pointing device moves back and forth, an image displayed on the image display apparatus may be gradually enlarged or reduced. Accordingly, this exemplary embodiment of the present invention does not limit the scope and spirit of the present invention.

Figure 3:
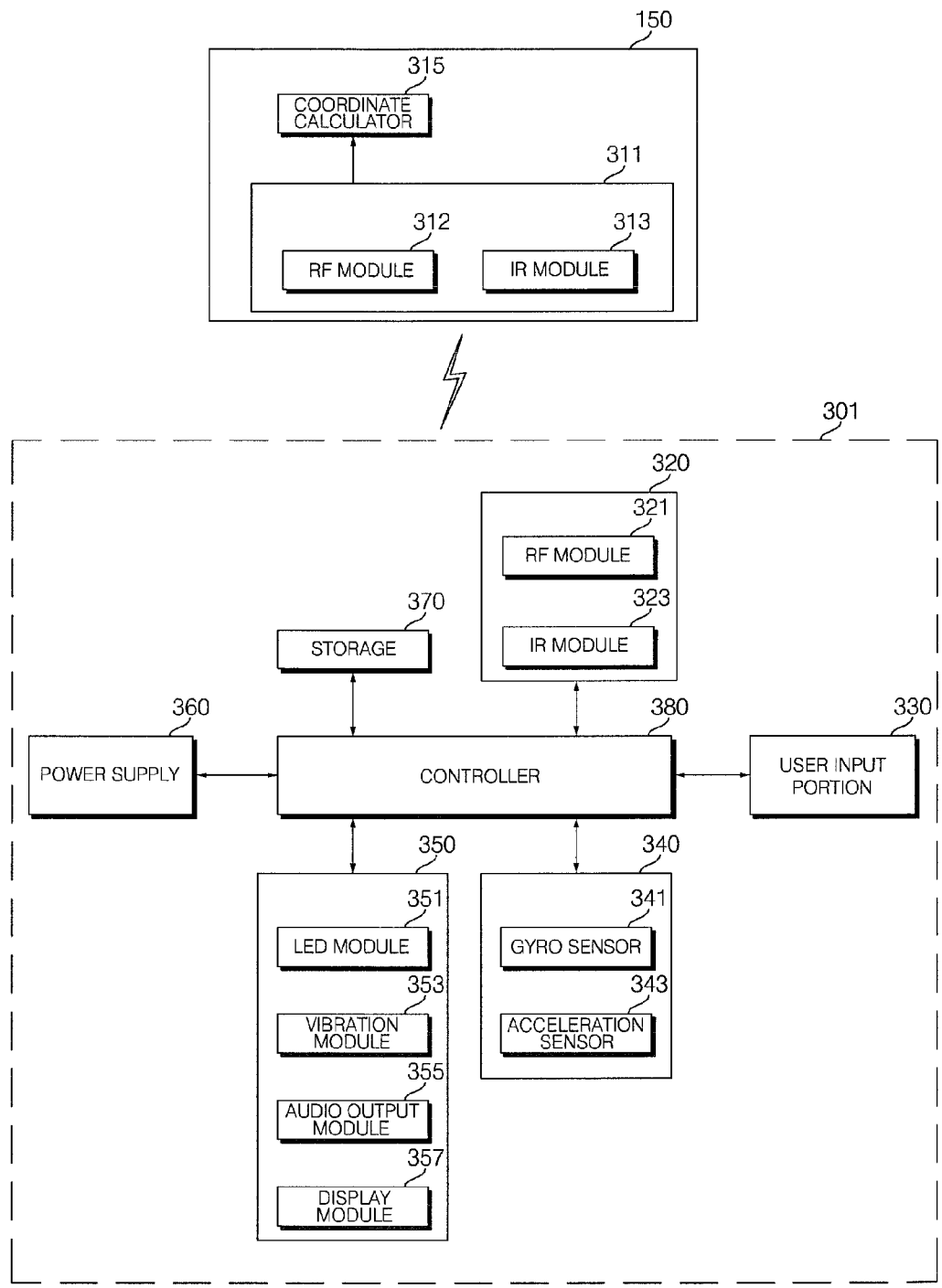
FIG. 3 is a diagram showing one embodiment that includes a user Input/Output (I/O) portion in an interface as shown in FIG. 1 which interacts with a pointing device as shown in FIG. 2B.

FIG. 3 shows pointing device 301 in FIGS. 2A and 2B and interface 150 in FIG. 1. This pointing device may include a wireless communication module 320, a user input portion 330, a sensor portion 340, an output portion 350, a power supply 360, a memory 370, and a controller 380.

The wireless communication module 320 may transmit signals to and/or receive signals from the image display apparatus. The wireless communication module may include an RF module 321 for transmitting RF signals to and/or receiving RF signals from the interface 150 of the image display apparatus according to an RF communication standard. The wireless communication module may also include an Infra-Red (IR) module 323 for transmitting IR signals to and/or receiving IR signals from the interface of the image display apparatus according to an IR communication standard.

The pointing device 301 transmits motion information regarding the movement of the pointing device to the image display apparatus through the RF module 321 in this exemplary embodiment. The pointing device may also receive signals from the image display apparatus through the RF module. The pointing device may transmit commands to the image display apparatus through the IR module, when needed, such as a power on/off command, a channel switching command, or a sound volume change command.

The user input portion 330 may include a keypad and/or a plurality of buttons. The user may enter commands to the image display apparatus by manipulating the user input portion. If the user input portion includes a plurality of hard-key buttons, the user may input various commands to the image display apparatus by pressing the hard-key buttons. Alternatively or additionally, if the user input portion includes a touch screen displaying a plurality of soft keys, the user may input various commands to the image display apparatus by touching the soft keys. The user input portion may also include various input tools other than those set forth herein, such as a scroll and/or jog key.

The sensor portion 340 may include a gyro sensor 341 and/or an acceleration sensor 343. The gyro sensor 341 may sense the movement of the pointing device 301, for example, in X-, Y-, and Z-axis directions, and the acceleration sensor 343 may sense the moving speed of the pointing device 301.

The output portion 350 may output a video and/or audio signal corresponding to a manipulation of the user input portion 330 or a signal transmitted by the image display apparatus. The user may easily identify whether the user input portion has been manipulated or whether the image display apparatus has been controlled based on the video and/or audio signal output by the output portion.

The output portion 350 may include a Light Emitting Diode (LED) module 351 which is turned on or off whenever the user input portion 330 is manipulated or whenever a signal is received from or transmitted to the image display apparatus through the wireless communication module 320, a vibration module 353 which generates vibrations, an audio output module 355 which outputs audio data, and a display module 357 which outputs video data.

The power supply 360 supplies power to the pointing device 301. If the pointing device is kept stationary for a predetermined time or longer, the power supply may, for example, reduce or cut off supply of power to the pointing device in order to save power. The power supply 360 may resume the power supply if a specific key on the pointing device is manipulated.

The memory 370 may store various application data for controlling or driving the pointing device 301. The pointing device may wirelessly transmit signals to and/or receive signals from the image display apparatus in a predetermined frequency band with the aid of RF module 321. The controller 380 of the pointing device may store information regarding the frequency band used for the pointing device to wirelessly transmit signals to and/or wirelessly receive signals from the paired image display apparatus in the memory and may then refer to this information for a later use.

The controller 380 provides overall control to pointing device 301. For example, the controller 380 may transmit a signal corresponding to a key manipulation detected from the user input portion 330 or a signal corresponding to a motion of the pointing device, as sensed by the sensor portion 340, to the interface 150 of the image display apparatus.

The interface 150 may include a wireless communication module 311 which wirelessly transmits signals to and/or wirelessly receives signals from pointing device 301, and a coordinate calculator 315 which calculates a pair of coordinates indicating the position of the pointer 302 on the display screen that is to be moved in accordance with the movement of the pointing device.

The wireless communication module 311 includes an RF module 312 and an IR module 313. The RF module 312 may wirelessly transmit RF signals to and/or wirelessly receive RF signals from the RF module 321 of the pointing device 301. And, the IR module 313 may wirelessly transmit IR signals to and/or wirelessly receive IR signals from the IR module 321 of the pointing device 301.

The coordinate calculator 315 may receive motion information regarding the movement of pointing device 301 from the wireless communication module 320 of the pointing device and may calculate a pair of coordinates (x, y) indicating the position of pointer 302 on a screen of the first display by correcting the motion information for possible errors such as a user's handshake.

A signal received in image display apparatus 100 from pointing device 301 through interface 150 may be transmitted to first or second controller 160 or 163. Then, the first or second controller may acquire information regarding the movement of pointing device and information regarding a key manipulation detected from the pointing device from the signal received from the interface 150, and may control the image display apparatus based on the acquired information.

The image display apparatus, remote controller, and pointing device (which may operate as a kind of the remote controller) are shown in FIGS. 1, 2 and 3 as having a number of components in a given configuration. However, the image display apparatus, remote controller, and/or pointing device may include fewer components or additional components than those shown in FIGS. 1, 2 and 3 in alternative embodiments.

Also, two or more components of the image display apparatus, remote controller 200, and/or pointing device 301 may be combined into a single component or a single component thereof may be separated into two more components in alternative embodiments. The functions of the components of the image display apparatus, remote controller, and pointing device as set forth herein are illustrative in nature and may be modified to satisfy, for example, the purposes of a given application.

Figure 4:
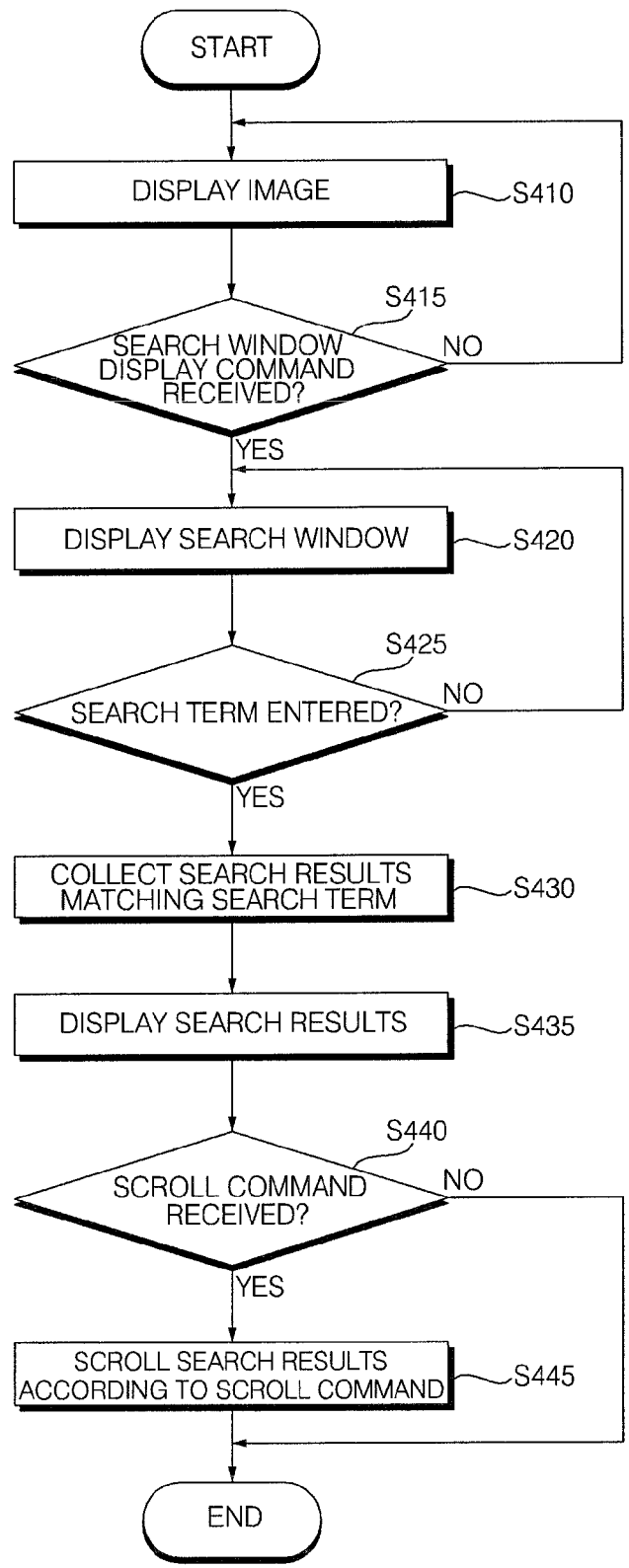
FIG. 4 is a diagram showing operations included in one embodiment of a method for operating the image display apparatus.

FIG. 4 shows operations included in one embodiment of a method for operating the image display apparatus, and FIGS. 5 to 10 show screens which may be generated in accordance with this method.

Referring to FIG. 4, an image is displayed in step S410. The image may be displayed on the first display 180 and may be a broadcast image received from tuner 120, an external input image received from the external signal input portion 128, or an image of multimedia data reproduced from the first or second storage 175 or 178. The image may be a still image or a moving picture. FIGS. 5(a), 6(a), 7(a), 8(a) and 9(a) respectively illustrate images 510, 610, 710, 810 and 910 displayed on the first display 180.

In step S415, it is determined whether a search window display command has been received. Specifically, the first or second display 160 or 163 determines whether the search window display command has been received from the user through the remote controller 200.

Upon receipt of the search window display command, a search window is displayed in step S420. Preferably, the search window is displayed separately from the image that is being displayed. Accordingly, as the search window is displayed on an additional display without disturbing the image being displayed on the first display 180, user convenience is increased. The second controller 163 may control the search window to be displayed on the second display 183.

For example, when the image display apparatus further includes the second display 183 in addition to the first display 180 as illustrated in FIGS. 5(b), 6(b), 7(b), 8(b) and 9(b), search windows 520, 620, 720, 820 and 920 may be displayed on the second display 183 whereas the images 510, 610, 710, 810 and 910 may be displayed on the first display 180.

Figure 5A:
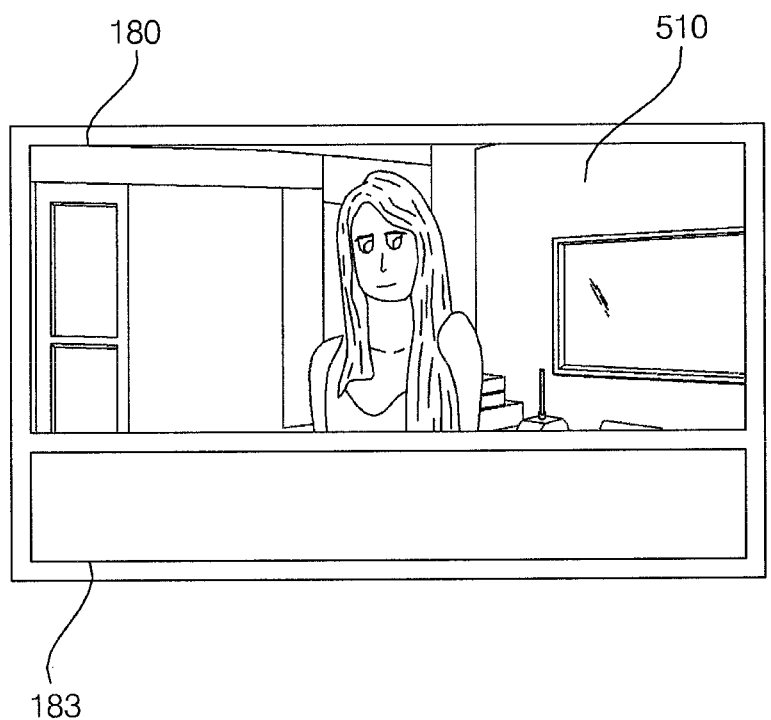
FIGS. 5 to 10 are diagrams showing examples of screens that may be generated in accordance with one or more embodiments described herein.
Figure 5B:
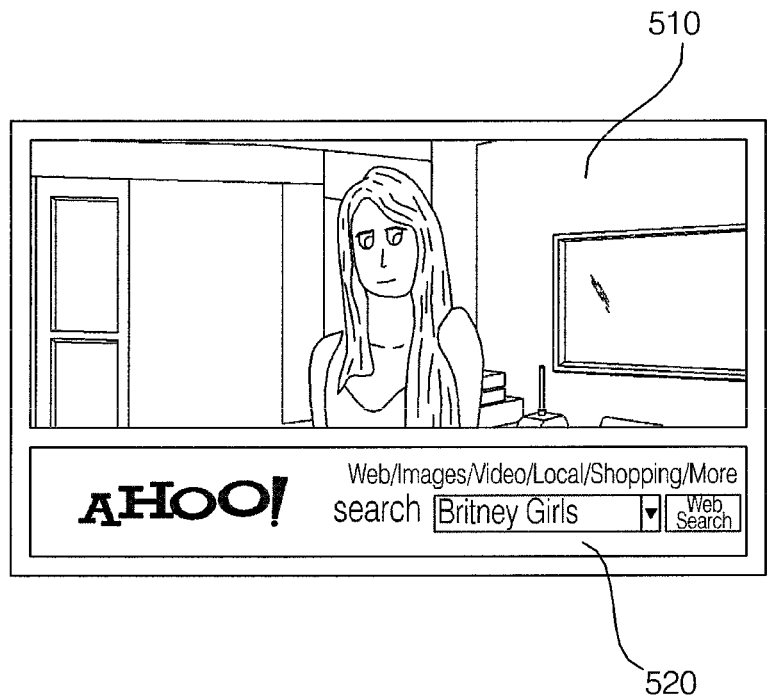
Figure 5C:
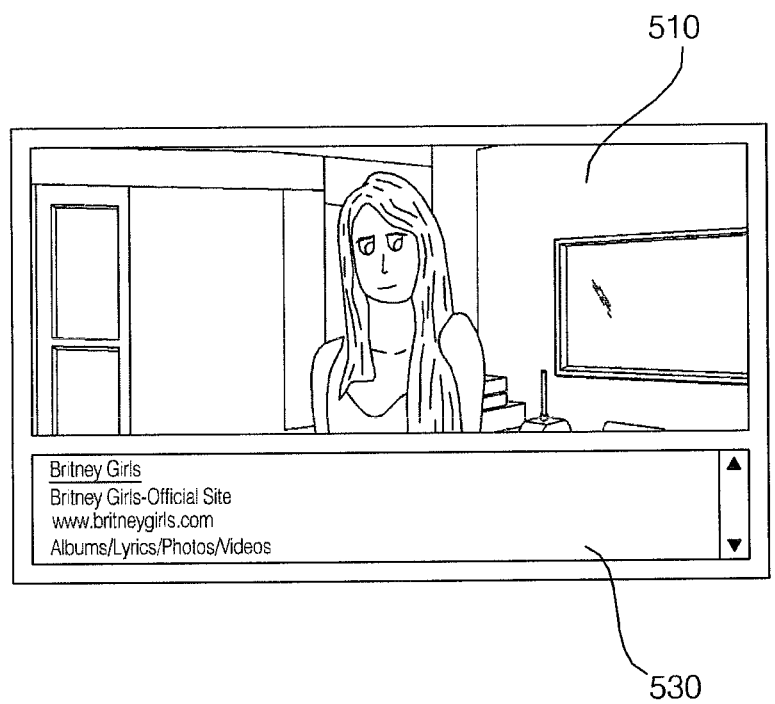

The search window may be a text-based search window. For example, the search window may be the text-based search window 520 that operates by a search engine available on the Web, as illustrated in FIG. 5(b). The image display apparatus may be connected to a predetermined Web site via the Ethernet port, the wireless communication module, or the IPTV set-top box of the afore-described external signal input portion 128, download a search window from the Web site, and display the downloaded search window as the search window 510 based on the Web search engine on the first display 180.

Figure 6A:
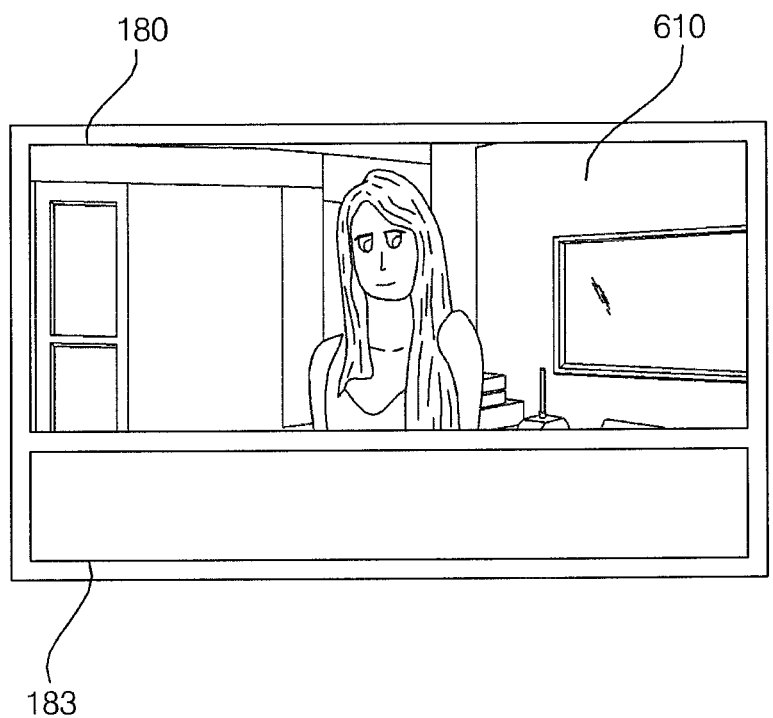
Figure 6B:
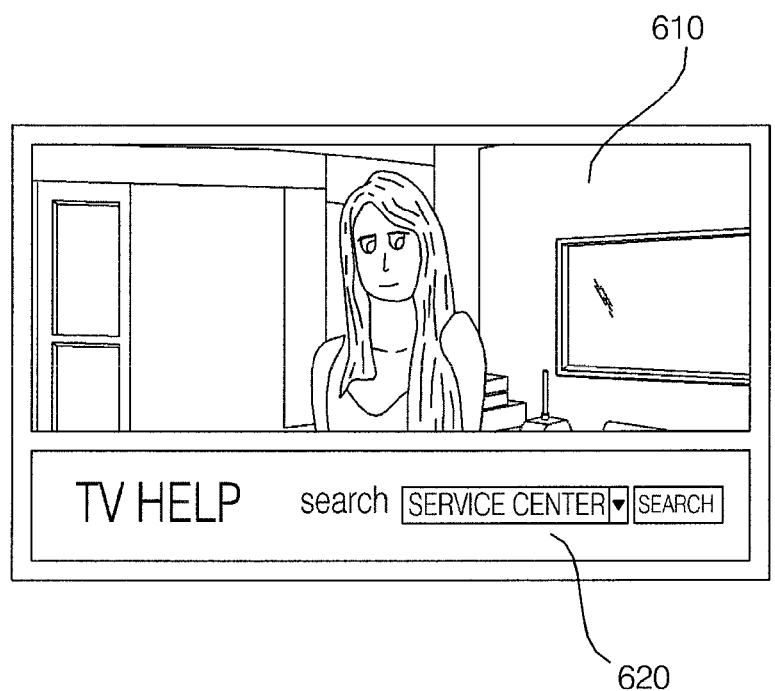

The search window may also be the text-based search window 620 designed for implementing a "Help" function in the image display apparatus 100, as illustrated in FIG. 6(b).

Figure 7A:
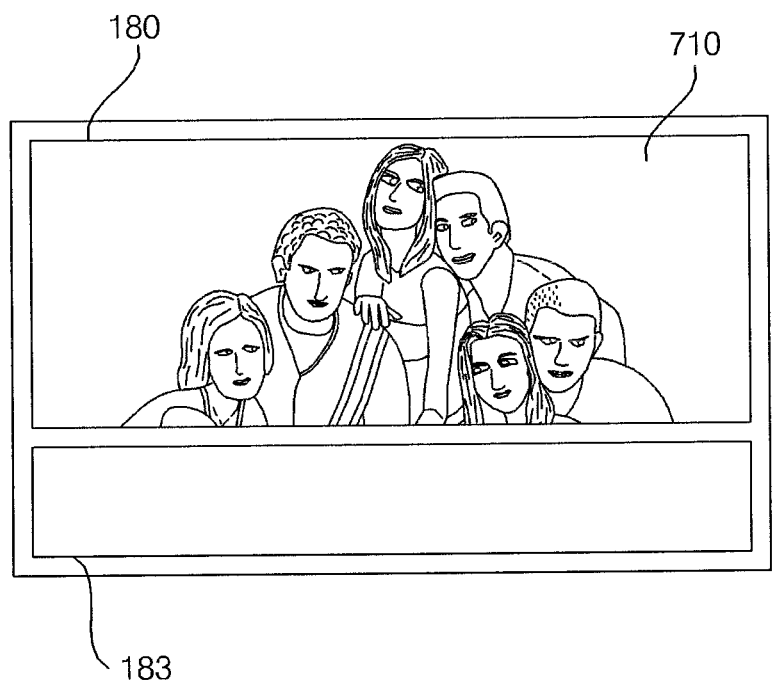
Figure 7B:
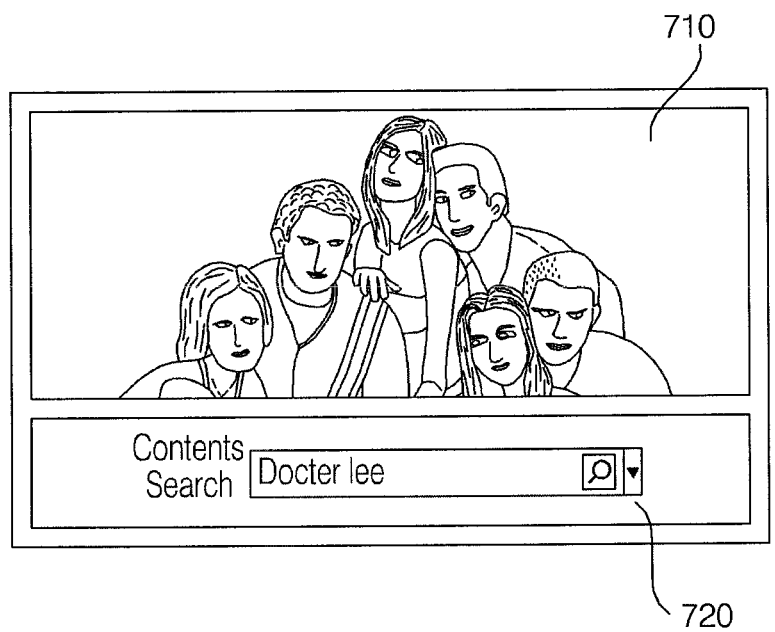

The search window may be a contents-based search window. For example, the search window may be the search window 720 for searching for contents, as illustrated in FIG. 7(b). While it is shown in FIG. 7 that a text search term is entered in the search window 720 based on a Web search engine, the search window 720 is classified as a contents-based search window since it is designed for contents search. A search across the Web may be performed through the Ethernet port, the wireless communication module, or the IPTV set-top box of the external signal input portion 128.

Figure 8A:
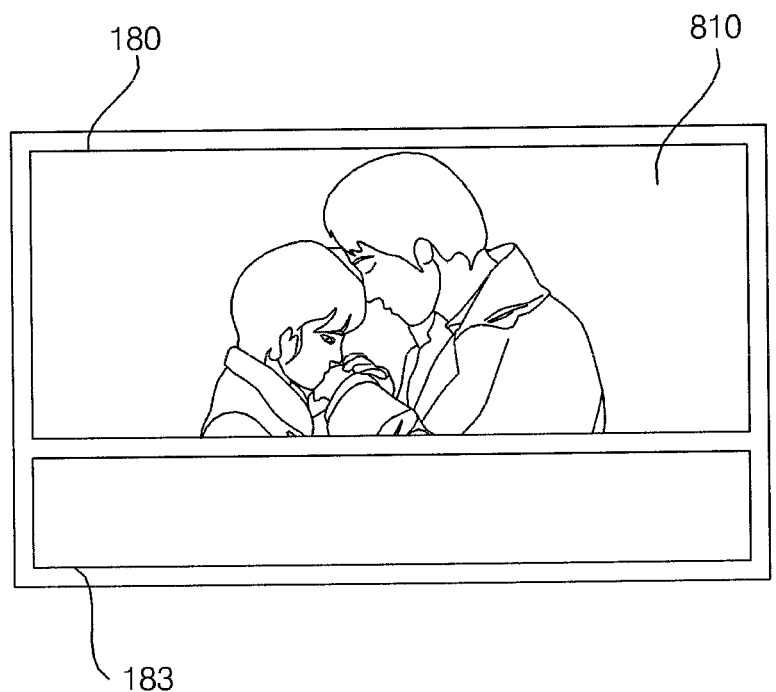
Figure 8B:
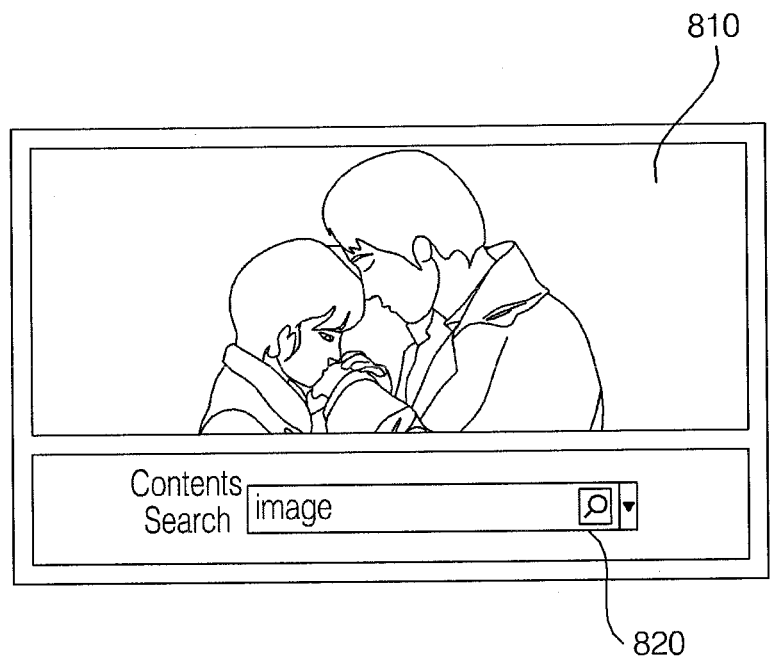

For example, the search window may be the contents-based search window 820 for searching the image display apparatus or an external device connected wirelessly or wiredly to the image display apparatus for contents, as illustrated in FIG. 8(b). While it is shown in FIG. 8 that a text search term is entered in the search window, the search window is classified as a contents-based search window since it is designed for contents search.

Figure 9A:
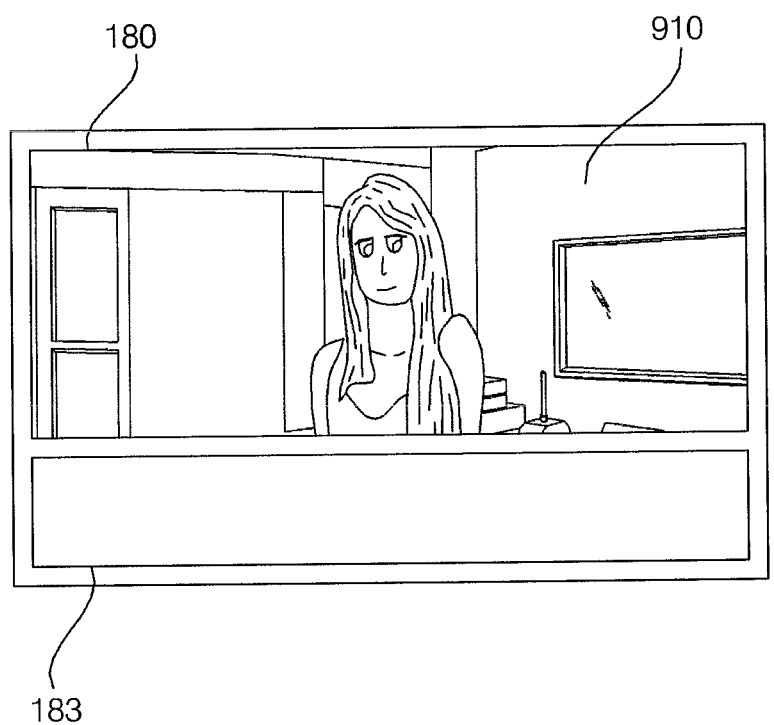
Figure 9B:
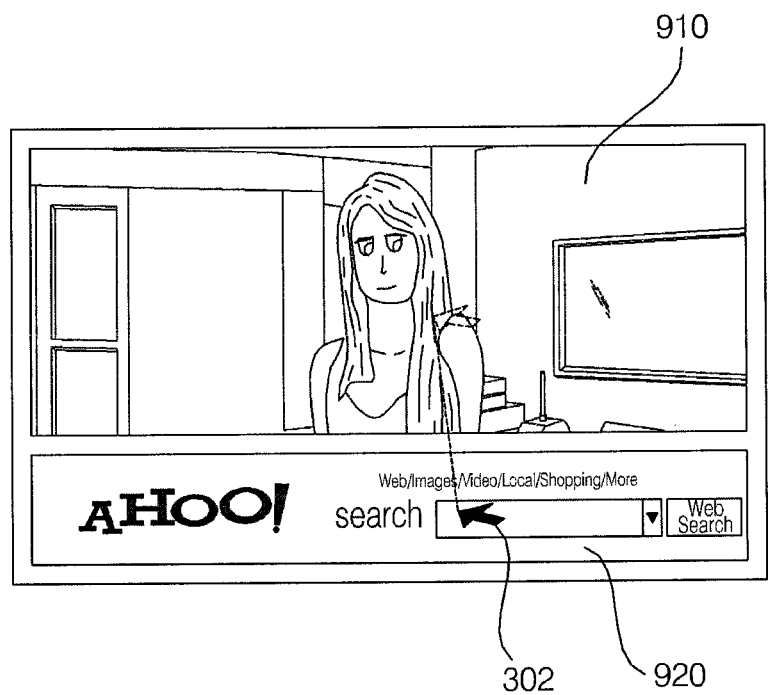

The search window may be the contents-based search window 920 in which a search term being contents is entered, as illustrated in FIG. 9(b). The search term may be an image or file.

Referring to FIG. 4 again, it is determined whether a search term has been entered completely in the search window in step S425. Specifically, the second controller 163 determines whether the user has completed entering a search term. For example, depending on whether a search object or a a search icon displayed along with the search window has been selected, the second controller 163 may determine whether the search term entry has been finished.

During the search term entry, an auto-completion function may be implemented while the user is tying in a search term. For auto-completion of search terms, entered search terms have been stored in the first or second storage 715 or 178. The second controller 163 may control possible suggestions associated with the search term entered in the search window to be retrieved from the first or second storage and to be displayed in the search window.

As described before, the search term may be text, contents itself, or information indicating contents. For example, words (e.g. service center and Doctor House) may be entered as a search term as illustrated in FIGS. 6 and 7. As illustrated in FIGS. 8 and 9, various other search terms are available, such as contents information (title, date, size, contents, etc.), contents types (image, movie, music, text, etc.), and contents file names (avi, jpg, mp3, etc.). In addition, video data or audio data may be used as a search term.

When the search term entry is completed, search results matching the search term are collected in step S430 and displayed in step S435.

The first or second controller 160 or 163 may collect the search results matching the search term, and the second controller may control the search results to be displayed on the second display 183.

If the search is made across the Web, the first or second controller 160 or 163 may receive search results collected on the Web through the Ethernet port, the wireless communication module, or the IPTV set-top box of the external signal input portion 128. In FIGS. 7(a) and 7(b), it is shown that contents are searched for on the Web and thus search results 730 are displayed on the second display 183.

Figure 6C:
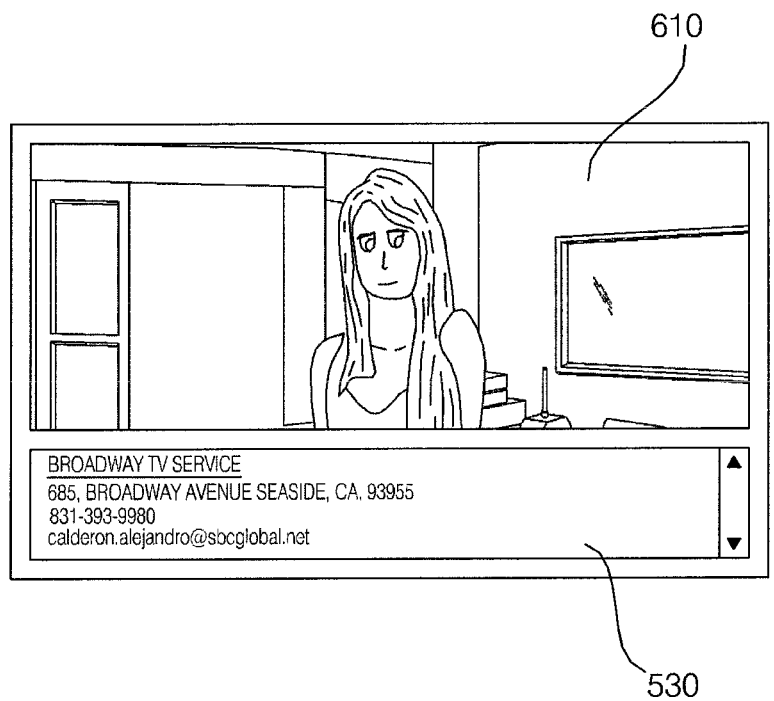

If the image display apparatus or the external device connected wirelessly or wiredly to the image display apparatus is searched in relation to the search term, the first or second controller 160 or 163 may perform the search using a search engine stored in the first or second storage 175 or 178. For example, when "Service Center" is typed in into the Help search window 620 in the image display apparatus 100 as illustrated in FIG. 6(b), search results 630 indicating the positions of service centers as retrieved from the first or second storage 715 or 178 may be displayed as illustrated in FIG. 6(c).

Figure 8C:
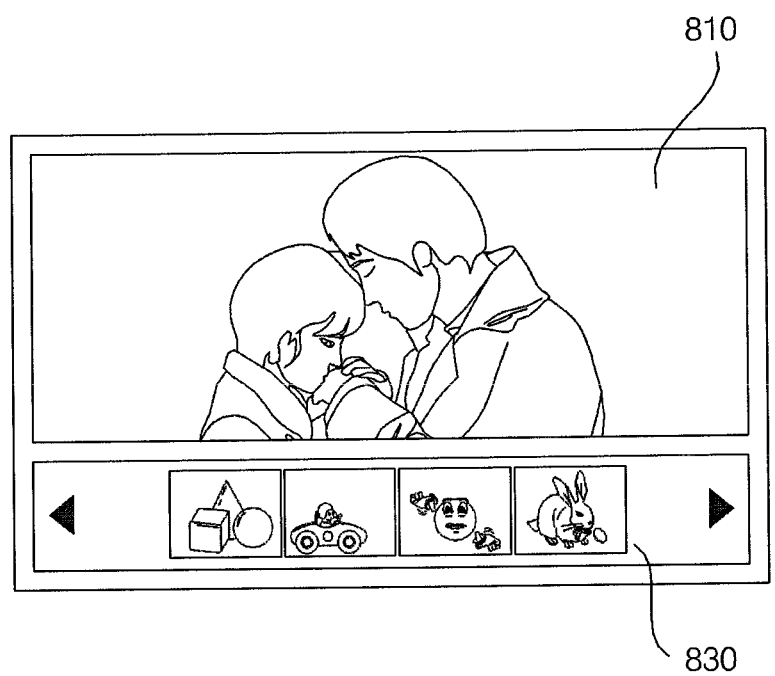

If "image" is entered in the search window 820 to search for contents in FIG. 8(b), the image display apparatus 100 or the external device connected wirelessly or wiredly to the image display apparatus 100 is searched and search results 830 may be displayed as illustrated in FIG. 8(c).

Figure 9C:
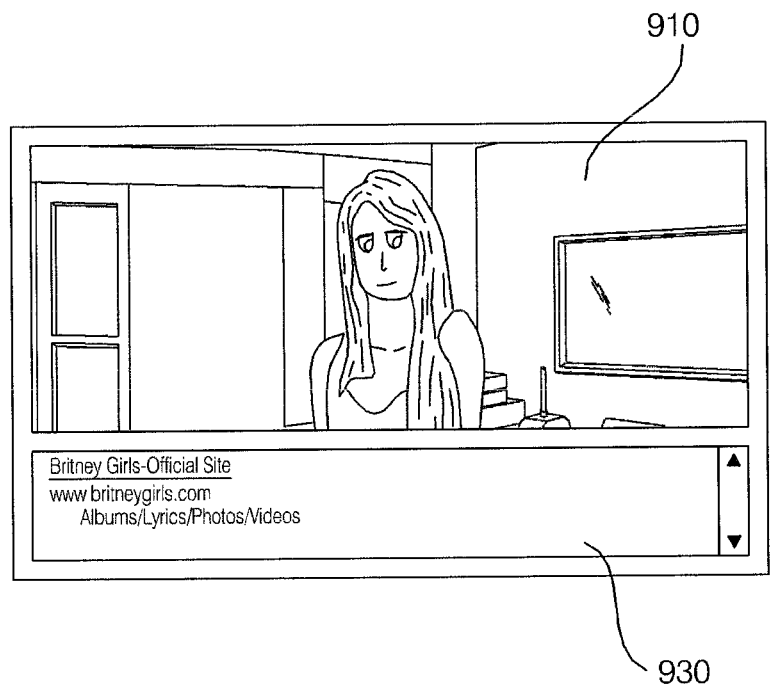

As illustrated in FIG. 9(b), if at least part of an image 910, that is, a character region of image 910 is dragged from first display 180 and then dropped on the search window 920 in order to search for contents, search results 930 matching to the character region, that is, information concerning a character in the character region may be displayed as illustrated in FIG. 9(c).

In the case where metadata indicating an object (e.g. a character, a place, a product, etc.) included in a broadcast image or an external input image is received in a stream signal, search results matching the contents of the metadata may be collected. The metadata may be extracted by demultiplexing the stream in the first or second controller 160 or 163.

In the illustrated case of FIG. 9(b), metadata corresponding to part of the image 910 displayed on the first display 180 includes information concerning the character and thus the information concerning the character is displayed as the search results on the second display 183.

In addition, if part of an image displayed on the first display 180, for example, a place or a product appearing in the image is dragged and dropped in the search window, information concerning the place or the product may be displayed as search results on the second display 183.

If a broadcast image displayed on the first display is dragged and dropped in the search window, broadcast information may be displayed as search results, including the title of a program corresponding to the broadcast image and the start time and end time of the program. The broadcast information may be extracted by demultiplexing a stream carrying the broadcast information in the first or second controller 160 or 163.

It is also possible to display image information including information concerning a coding scheme of an image, the producer of the image, etc. as search results. The image information may be extracted by demultiplexing a stream carrying the image information or decoding a demultiplexed video signal in the first or second controller 160 or 163.

Figure 7C:
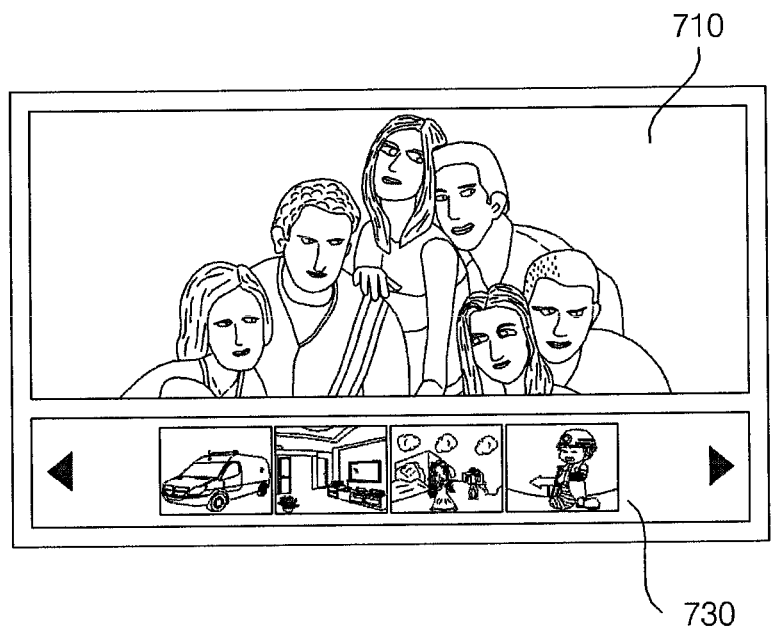

On the other hand, if search results are contents, images indicating the contents may be displayed as illustrated in FIGS. 7 and 8. A list of a plurality of images is shown to be displayed on the second display 183 in FIGS. 7(c) and 8(c). Hence, the user can intuitively identify what the contents are about. When a specific image is selected from the image list, an image corresponding to the selected image may be displayed on the first display 180.

The image may be generated in an image generator (not shown). The image generator may be included in the first controller 160, the second controller 163, or the channel browsing processor, but particularly in the second controller to thereby reduce the amount of data to be processed by the first controller. While contents are shown as images herein, to which the present invention is not limited, voice files, text files, etc. may be indicated in the form of images.

In this manner, the search windows 520, 620, 720, 820 and 920 or the search results 530, 630, 730, 830 and 930 can be displayed on the second display 183, while the images 510, 610, 710, 810 and 910 are displayed on the first display 180. Therefore, the user can perform an additional operation readily while viewing an on-going image without disturbance. Hence, user convenience is increased.

The second controller 163 may receive at least one of search window information and search results information from the first controller 160.

The first or second storage 715 or 178, particularly the second storage 718 may store search results. A list is created with the search results, so that the search result list may be retrieved later upon request of the search results. Accordingly, the user can view previous search results easily.

In the case where a search is performed not across the Web but across the image display apparatus 100 or the external device connected wirelessly or wiredly to the image display apparatus 100, the first or second controller 160 or 163 may perform the search according to an input search term using the search engine stored in the first or second storage 175 or 178.

A search window and search results are shown in FIGS. 7, 8 and 9 to be displayed on the second display 183, while an image is displayed on the first display 180. However, the present invention is not limited to the specific exemplary applications. For example, it may be contemplated that a third display (not shown) is additionally provided to the image display apparatus 100 and thus the search window and the search results are displayed on the second display 183 and the third display, respectively, with the image displayed on the first display 180. A third controller (not shown) may be responsible for controlling the third display.

Referring to FIG. 4 again, it is determined whether a scroll command has been received while the search results are displayed in step S440. Specifically, the first or second display 160 or 163 determines whether there is a scroll command to further view the search results on the second display 183.

Figure 10A:
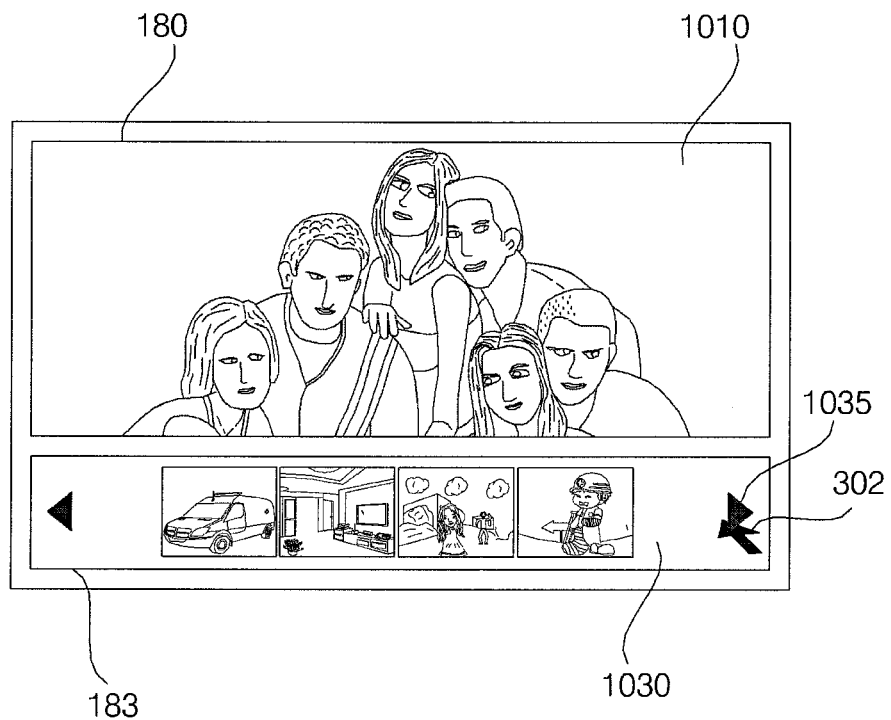
Figure 10B:
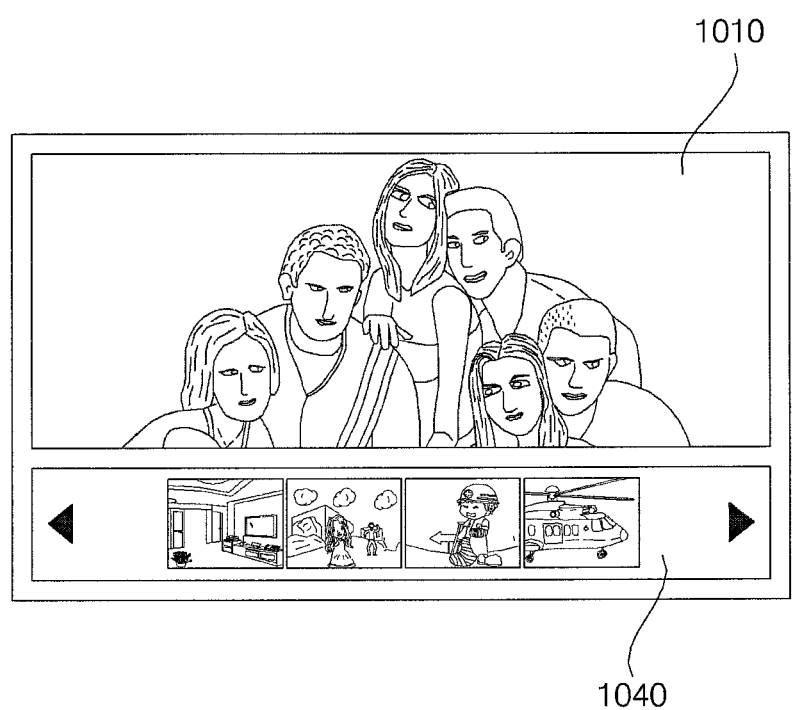

For example, it may be determined whether a scroll object 1035 displayed on the second display 183 has been selected through the remote controller 200 as illustrated in FIG. 10(*a*).

The scroll command may be issued by a cursor movement of the remote controller 200, a pointer movement of the pointing device 301, or a user's gesture. While it is shown in FIG. 10(*a*) that a right scroll command is issued, to which the present invention is not limited, left, up, and down scroll commands are also available.

Upon receipt of the scroll command, a screen with the search results is scrolled according to the scroll command in step S445. The first or second controller 160 or 163 controls scrolled search results to be displayed on the second display 183 according to the scroll command. For example, if a right scroll command has been received with search results 1030 presented in a search window 1020 on the second display 183 as illustrated in FIG. 10(*a*), search results 1040 obtained by scrolling the search window 1020 to the right are displayed on the second display 183, as illustrated in FIG. 10(*b*). As the search results can be scrolled in this way, the user can easily view search results that are not displayed due to the size of the second display 183.

The image display apparatus and the operation method therefore according to the foregoing exemplary embodiments are not restricted to the exemplary embodiments set forth herein. Therefore, variations and combinations of the exemplary embodiments set forth herein may fall within the scope of the present invention.

The operation method of an image display apparatus according to the foregoing exemplary embodiments may be implemented as code that can be written on a computer-readable recording medium and can thus be read by a processor. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

According to one or more of the aforementioned exemplary embodiments, when a specific menu, particularly a search window is selected during displaying an image, the search window is displayed on an additional second display in a single image display apparatus. As a user is allowed to view the on-going image despite an additional task, user convenience is increased.

Since search results matching a search term entered in the search window are displayed on the second display, the user convenience is further increased. If the search results are contents, images corresponding to the contents are displayed. Thus, the user can intuitively identify what the contents are about. Furthermore, the search results can be scrolled, so that the user navigates the search results easily. In the case where the search results are contents, if a specific image is selected from a list of images indicating the contents, an image corresponding to the selected image is displayed on a first display. Thus the user can easily view his desired image.

One or more embodiments described herein provide an image display apparatus and an operation method therefore.

According to one aspect, there is provided a method for operating an image display apparatus having a first display and a second display different from the first display, which includes displaying an image on the first display, displaying a search window on the second display, and displaying search results matching a search term entered in the search window.

According to another aspect, there is provided an image display apparatus including a first display, a second display different from the first display, a first controller for controlling the first display to display an image, and a second controller for controlling the second display to display a search window.

While the present invention has been particularly shown and described with reference to exemplary embodiments thereof, it will be understood by those of ordinary skill in the art that various changes in form and details may be made therein without departing from the spirit and scope of the present invention as defined by the following claims.

The terms "module" and "portion" attached to describe the names of components are used herein to help the understanding of the components and thus they should not be considered as having specific meanings or roles. Accordingly, the terms "module" and "portion" may be interchangeable in their use Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments, it should be understood that numerous other modifications and/or combinations of the embodiments described herein can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling display of information, comprising:
    displaying, by a first controller, an image on a first display;
    displaying, by a second controller, a search window on a second display that is physically separate from the first display, wherein the first and second controller are operated in parallel, the search window is displayed on the second display by a separate procedure from the image on the first display, and the image displayed on the first display is not scaled or disturbed by the search window displayed on the second display;
    receiving a search term input at the search window;
    displaying search results that match the search term input into the search window while displaying the image on the first display,
    wirelessly receiving, through an RF module, motion information regarding movement of a remote controller;
    calculating, by a coordinate calculator, coordinates of a pointer to be displayed; and
    displaying the pointer in the first display or the second display,
    wherein the pointer moves across the first and second displays,
    wherein the calculating step calculates coordinates of the pointer by correcting the motion information for error based on a user's handshake,
    wherein the search results include at least one of
        broadcast information corresponding to the image,
        coding information corresponding to the image,
        information corresponding to a product appearing in the image,
        information corresponding to a place or location appearing in the image, or
        information corresponding to a person or a character appearing in the image,
    wherein the first display and second display are in a same image display device, and
    wherein the first display and the second display are independent display panels.

2. The method of claim 1, wherein the search term includes a text-based term and wherein the displayed search results match the text-based search term.

3. The method of claim 1,
    wherein the search term is generated by dragging and dropping an image from the first display to the search window in the second display and wherein the search results correspond to at least part of the image dragged or dropped into the search window using the pointer.

4. The method of claim 1, wherein the search results are obtained by performing a search based on a circuit or browser operated within the image display device or operated within an external device coupled to the image display device.

5. The method of claim 1, wherein the search results are obtained based on a Web search.

6. The method of claim 1, further comprising:
    scrolling the search results in response to a scroll command.

7. The method of claim 6, wherein the scroll command is issued by the pointer based on information from a remote controller.

8. The method of claim 1, wherein when an object in an image is dragged and dropped in the search window, information of the search results displayed on the second display is varied according to the object.

9. The method of claim 1, further comprising:
    when an object in an image is dragged and dropped in the search window, extracting metadata concerning the object included in the image.

10. The method of claim 1, wherein a list of images corresponding to the search results are displayed.

11. The method of claim 10, further comprising:
    outputting contents corresponding to a selected one of the images.

12. The method of claim 1, wherein when a broadcast image displayed on the first display is dragged and dropped in the search window, broadcast information is displayed as the search results, the broadcast information including a title of a program corresponding to the broadcast image and a start time and an end time of the program.

13. The method of claim 12, wherein the broadcast information is extracted by demultiplexing a data stream carrying the broadcast information.

14. The method of claim 1,
    wherein, when the remote controller moves back or forth, the image displayed on the first display is gradually enlarged or reduced.

15. An image display apparatus comprising:
    a first display;
    a second display that is physically separate from the first display;
    an interface to receive motion information from a remote controller;
    a first controller to control the first display to display an image; and
    a second controller to control the second display to display a search window simultaneously with display of the image in the first display to receive a search term input into the search window and to control the second display to display search results that match the search term entered in the search window while displaying the image on the first display,
    wherein the pointer is displayed on the first display or the second display,
    wherein the pointer moves across the first and second displays,
    wherein the coordinate calculator calculates coordinates of the pointer by correcting the motion information for error based on a user's handshake,
    wherein the search results include at least one of
        broadcast information corresponding to the image,
        coding information corresponding to the image,
        information corresponding to a product appearing in the image,
        information corresponding to a place or location appearing in the image, or
        information corresponding to a person or a character appearing in the image, wherein the first and second controller are operated in parallel, wherein the search window is displayed on the second display by a separate procedure from the image on the first display, wherein the image displayed on the first display is not scaled or disturbed by the search window displayed on the second display, and wherein the first display and the second display are independent display panels.

16. The apparatus of claim 15, further comprising:
a tuner to receive a broadcast signal of a selected channel or a broadcast signal of a preliminarily stored channel; and
an external input to receive an external signal, wherein the image is a broadcast image or an external input image.

17. The apparatus of claim 15, further comprising:
an image generator to generate one or more images obtained from a search performed using the search window.

18. The apparatus of claim 15, wherein when an object in an image is dragged and dropped in the search window, the second controller controls the second display to display information of the search results varied according to the object.

19. The apparatus of claim 15, wherein when a broadcast image displayed on the first display is dragged and dropped in the search window, broadcast information is displayed as the search results, the broadcast information including a title of a program corresponding to the broadcast image and a start time and an end time of the program.

20. The apparatus of claim 19, wherein the broadcast information is extracted by demultiplexing a data stream carrying the broadcast information.

21. The apparatus of claim 15,
wherein, when the remote controller moves back or forth, the image displayed on the first display is gradually enlarged or reduced.

22. An image display apparatus comprising:
an enclosure;
a first display device mounted in the enclosure;
a second display device mounted in the enclosure and positioned adjacent the first display device, the first and second display devices being different display devices and mounted in the enclosure to be physically separate from each other;
an interface to receive motion information from a remote controller;
a first controller to control the first display device to display an image; and
a second controller to control the second display device to display a search window simultaneously with display of the image in the first display device to receive a search term input into the search window and to control the second display device to display search results that match the search term entered in the search window while displaying the image on the first display device,
wherein the interface includes
an RF module configured to wirelessly receive motion information regarding movement of a remote controller, and
a coordinate calculator configured to calculate coordinates of a pointer to be displayed,
wherein the pointer is displayed on the first display or the second display,
wherein the pointer moves across the first and second displays,
wherein the coordinate calculator calculates coordinates of the pointer by correcting the motion information for error based on a user's handshake,
wherein the search results include at least one of
broadcast information corresponding to the image,
coding information corresponding to the image,
information corresponding to a product appearing in the image,
information corresponding to a place or location appearing in the image, or
information corresponding to a person or a character appearing in the image,
wherein the first and second controllers are operated in parallel, and
wherein the search window is displayed on the second window by a separate procedure from the image displayed on the first display device.

* * * * *